No. 705,071. Patented July 22, 1902.
L. F. GRAHAM.
MACHINE FOR FACING FRUIT FOR PACKING.
(Application filed Jan. 9, 1902.)
(No Model.) 2 Sheets—Sheet 1.

No. 705,071. Patented July 22, 1902.
L. F. GRAHAM.
MACHINE FOR FACING FRUIT FOR PACKING.
(Application filed Jan. 9, 1902.)

(No Model.) 2 Sheets—Sheet 2.

Witnesses.
F. Monteverde.
Walter F. Vane.

Inventor.
Lozelle Forbes Graham
by Wm. F. Booth
his Atty.

UNITED STATES PATENT OFFICE.

LOZELLE FORBES GRAHAM, OF SAN JOSE, CALIFORNIA.

MACHINE FOR FACING FRUIT FOR PACKING.

SPECIFICATION forming part of Letters Patent No. 705,071, dated July 22, 1902.

Application filed January 9, 1902. Serial No. 88,971. (No model.)

*To all whom it may concern:*

Be it known that I, LOZELLE FORBES GRAHAM, a citizen of the United States, residing at San Jose, county of Santa Clara, State of California, have invented certain new and useful Improvements in Machines for Facing Fruit for Packing; and I do hereby declare the following to be a full, clear, and exact description of the same.

My invention relates to the general class of fruit-handling machinery, and especially to machines or devices for preparing fruit for packing.

In the handling of dried or cured prunes preparatory to packing one of the operations is known as "thumbing," which is to flatten or face the prunes for packing in boxes, its object being to present the fruit in neatly-arranged layers. It is done by hand, the operator taking each prune in his fingers and by the pressure of the thumbs thereon flattening it out or "facing" it, as it is called, so that it will lie snugly and neatly in the packed layer. This hand operation or thumbing consumes time and is quite tiresome, as the muscles of the fingers and thumbs soon grow weary.

The object of my invention is to provide a suitable machine to do this work, which said machine shall preserve the essentials of the hand operation. By this I mean that the pressure brought to bear on the fruit must approximate in degree and kind that which is applied by hand. There must be no crushing force, and the presence of the pit or stone must be taken into consideration. The flesh of the fruit must be pressed equally, firmly, but gently to flatten it and conform it generally to the pit without bruising or crushing. In such a machine, therefore, the pressure must be a yielding one, conformable fully to the shape of the fruit.

My invention consists, to this end, in suitable cushioned pressure-surfaces to which the fruit is subjected.

It also consists in cushioned pressure-rolls and suitable carriers for passing the fruit between the rolls.

It also consists in the novel combinations and arrangement of parts which I shall now describe by reference to the accompanying drawings, in which—

Figure 1:
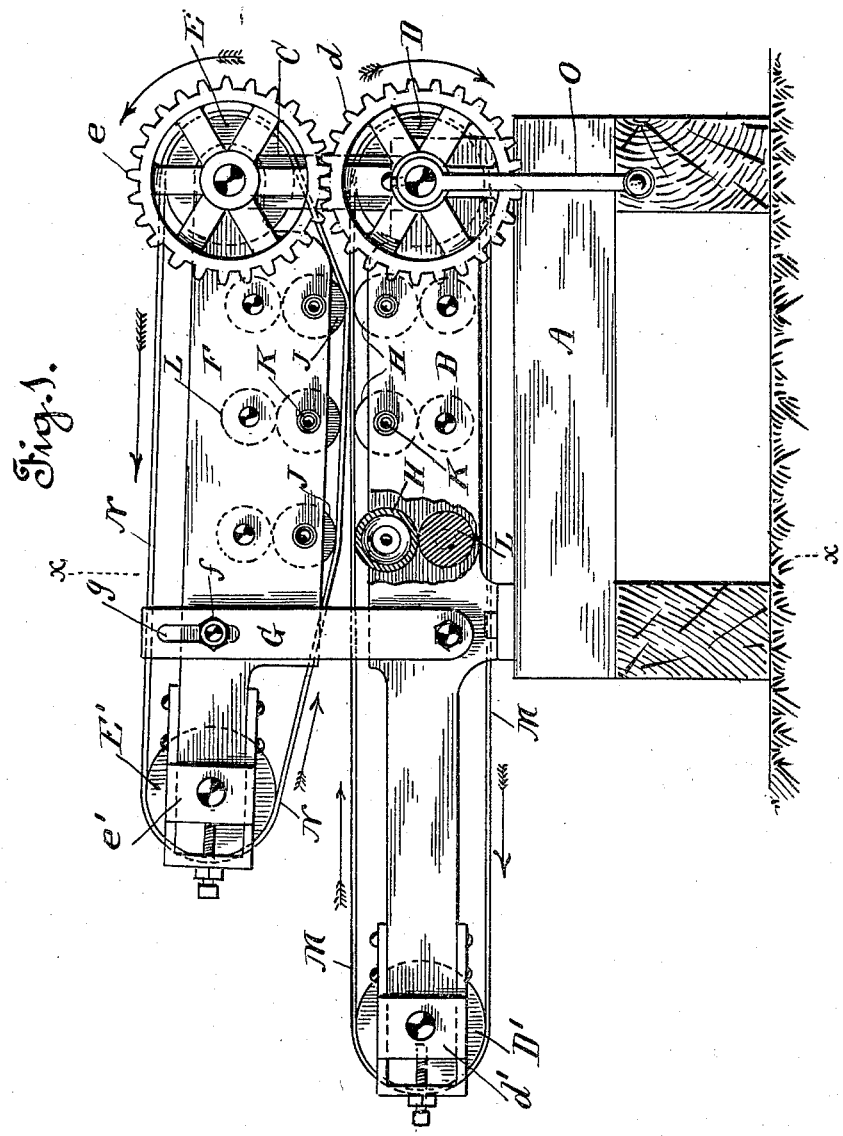
Figure 2:
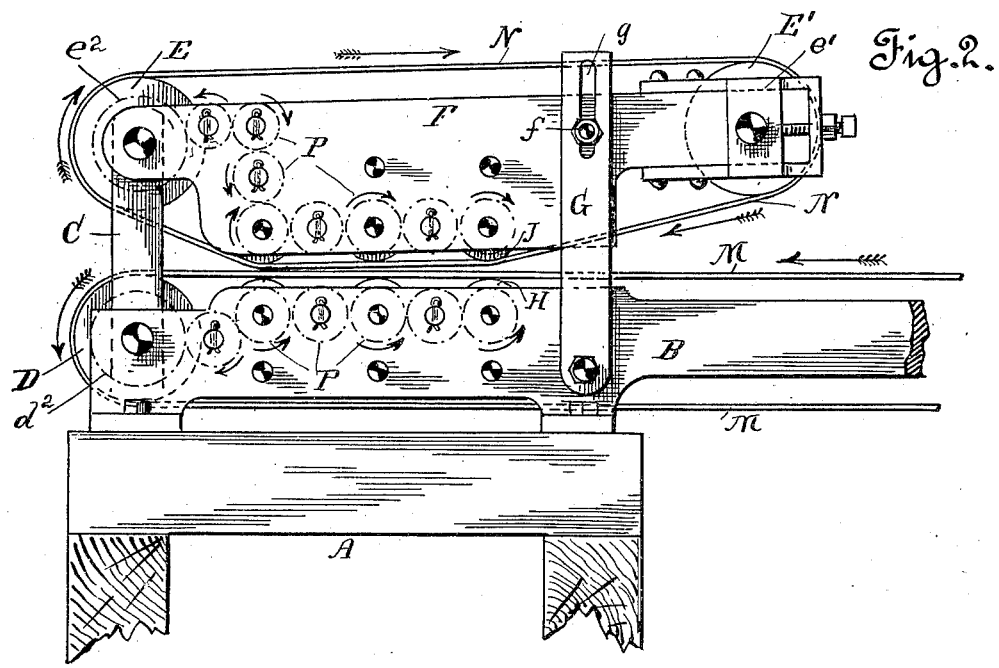
Figure 3:
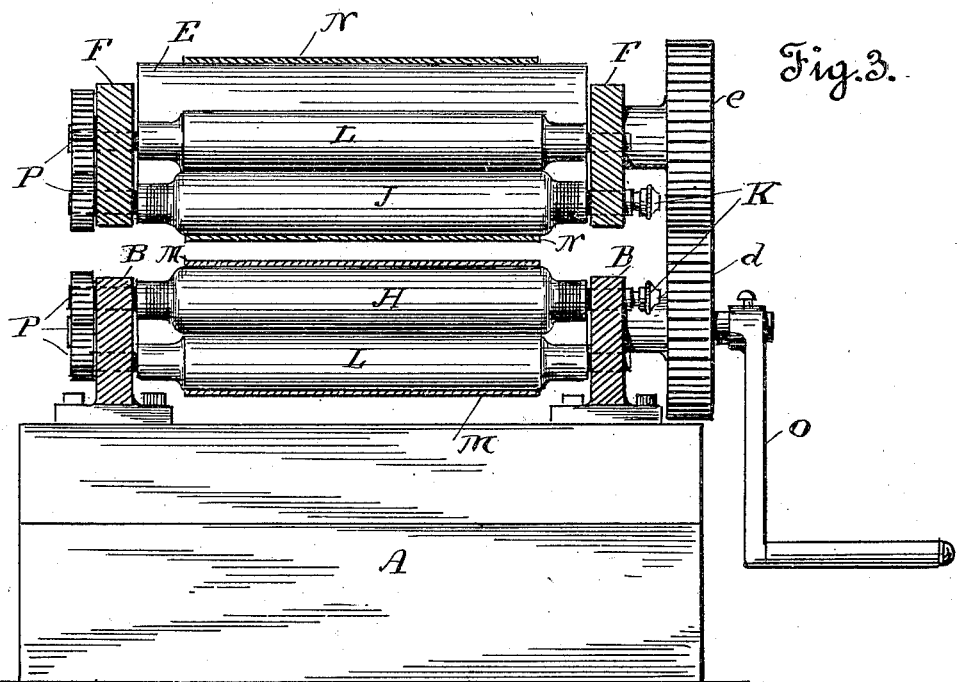

Figure 1 is a side view of my machine, partly broken to show one of the pneumatic pressure-rolls in cross-section. Fig. 2 is a view of the machine from the other side. Fig. 3 is a vertical cross-section of the machine on line $x\ x$ of Fig. 1.

A is a table or base to which is secured the lower or fixed frame B. At the foot of the machine are standards C, which carry in their lower portions the drum D and in their upper portions the drum E. Upon the axis of the upper drum is pivotally mounted the rear end of the upper or adjustable frame F. Bars G rise from the fixed frame B, the upper ends of said bars having slots $g$, which receive set-bolts $f$ of frame F, whereby said frame F may be raised or lowered and fixed where adjusted with relation to the lower frame. In the lower or fixed frame are mounted the lower pressure-rolls H, and in the upper or adjustable frame F are mounted the upper pressure-rolls J. There may be as many of these pressure-rolls as may be desired, and they lie in superposed pairs. These rolls are cushioned rolls—that is, made soft or yielding, with resiliency to return to and maintain their shape. The best form of a cushion is a pneumatic one, and therefore I make these rolls H and J pneumatic rolls, by which I mean that they are hollow flexible cylinders of rubber or other air-tight material filled with compressed air. I show one end of each roll as provided with a nipple K for forming the connection with a source of air-supply, whereby they may be filled to that degree of hardness which may be necessary for the work.

L represents hard rolls of metal or other material, which back up the pneumatic rolls and hold them to place.

In the forward end of the lower or fixed frame B is a drum D', and in the forward end of the upper frame F is a drum E'.

M is an endless carrier-belt which passes over the terminal drums D and D', and N is an endless carrier-belt passing over the terminal drums E and E'. These carriers travel between the pressure-rolls in the same direction, as indicated by the arrows. They are kept at the necessary tightness by adjusting the drums D' and E', which, as shown, are mounted in their respective frames in adjustable boxes $d'$ and $e'$.

Motion may be imparted to the carriers and to the pressure-rolls by any suitable means. I have here shown a gear $d$ on drum D, to which a crank O or other power may be applied. A gear $e$ on the shaft of drum E meshes with gear $d$. On the other ends of these drum-shafts are gears $d^2$ and $e^2$, from which trains of pinions (designated generally by P) extend to the several pressure-rolls, whereby the said rolls are driven.

By adjusting the upper frame F its pressure-rolls J are moved relatively to the lower pressure-rolls in order to give any degree of pressure desired. The upper frame F, being pivotally mounted upon the axis of the upper drum E, rises in an arc of a circle, thereby carrying its series of pressure-rolls J up in such manner that, as shown in Fig. 2, the distance between the upper and lower pressure-roll of each pair decreases from the first pair, where the carriers enter, to the last pair, where the carriers emerge from between the rolls. This results in subjecting the fruit to a successively-increasing pressure as it passes between the series of pressure-rolls—that is to say, the fruit is gently pressed between the first pair of more widely separated rolls, is pressed with slightly-increased force between the next pair, which are a little closer together, and so on, receiving its final pressure between the least-separated final rolls. This avoids any sudden and too forceful pressure which would tend to bruise the fruit, because under the successively-increasing pressure the fruit yields properly and without damage very much as it does under the continued hand "thumbing" process.

The operation of the machine is as follows: The prunes are laid upon the lower carrier M and are conveyed by and between the two carriers M and N to and between the cushioned or pneumatic pressure-rolls H and J, which flatten or face them, causing the flesh to press closely around the pit without crushing or bruising. When delivered from the tail of the machine, they are ready for packing.

Having thus described my invention, what I claim as new, and desire to secure by Letters Patent, is—

1. In a fruit-facing machine, the combination of opposing frames, one of which is adjustable in an arc of a circle to and from the other, a series of pairs of opposing cushioned pressure-rolls carried by said frames, said pairs being adapted by the adjustment of said frame to have their members separated by successively-decreasing distances from the first to the last pair, rigid backing-rolls carried by the frames for holding said pressure-rolls in place and means for feeding the fruit between said rolls in the direction of said decreasing distances.

2. In a fruit-facing machine, the combination of opposing pneumatic pressure-rolls between which the fruit is passed and rigid backing-rolls for said pneumatic rolls to hold them in place.

3. In a fruit-facing machine, the combination of opposing cushioned pressure-rolls, means for relatively adjusting said rolls, to vary their pressure, rigid backing-rolls for said pressure-rolls to hold them in place and endless traveling carriers arranged to carry the fruit between them through said rolls.

4. A fruit-facing machine consisting of relatively adjustable frames, cushioned pressure-rolls carried by said frames and disposed in superposed pairs, rigid backing-rolls carried by the frames for holding said pressure-rolls in place, terminal drums carried by the frames, endless carriers mounted on the drums and passing between the rolls, and suitable means for driving said carriers and rolls.

In witness whereof I have hereunto set my hand.

LOZELLE FORBES GRAHAM.

Witnesses:
WALTER F. VANE,
D. B. RICHARDS.